United States Patent [19]

Gocke

[11] 4,043,357

[45] Aug. 23, 1977

[54] FILTER FITTING FOR HEATING INSTALLATIONS

[75] Inventor: Eberhard Wilhelm Gocke, Mosbach, Germany

[73] Assignee: Braukmann Armaturen AG, Rothrist, Switzerland

[21] Appl. No.: 614,247

[22] Filed: Sept. 17, 1975

[51] Int. Cl.² .............................................. F16K 31/14
[52] U.S. Cl. ................................. 137/495; 137/505.36
[58] Field of Search ............. 137/495, 505.26, 505.29, 137/505.36, 505.41, 505.42

[56] References Cited

U.S. PATENT DOCUMENTS

| 1,286,397 | 12/1918 | Olsen | 137/495 X |
| 3,547,427 | 12/1970 | Kelly | 137/505.41 X |
| 3,665,956 | 5/1972 | Hammon | 137/505.42 X |
| 3,747,629 | 7/1973 | Bauman | 137/505.41 X |

FOREIGN PATENT DOCUMENTS

| 717,043 | 2/1942 | Germany | 137/495 |

Primary Examiner—Harold W. Weakly

[57] ABSTRACT

A filler fitting for heating installations has a housing with an inlet, an outlet and between them a pressure-reducer having a valve mechanism which includes a valve stem spring loaded to an open position; to facilitate filling a releasable pin is provided which acts on the valve stem by means of a lifting cam located outside the housing. The cam is also capable of rotation and the pin can thereby act to adjust the spring pressure on the valve mechanism independently of the action of the pin on the valve stem.

2 Claims, 1 Drawing Figure

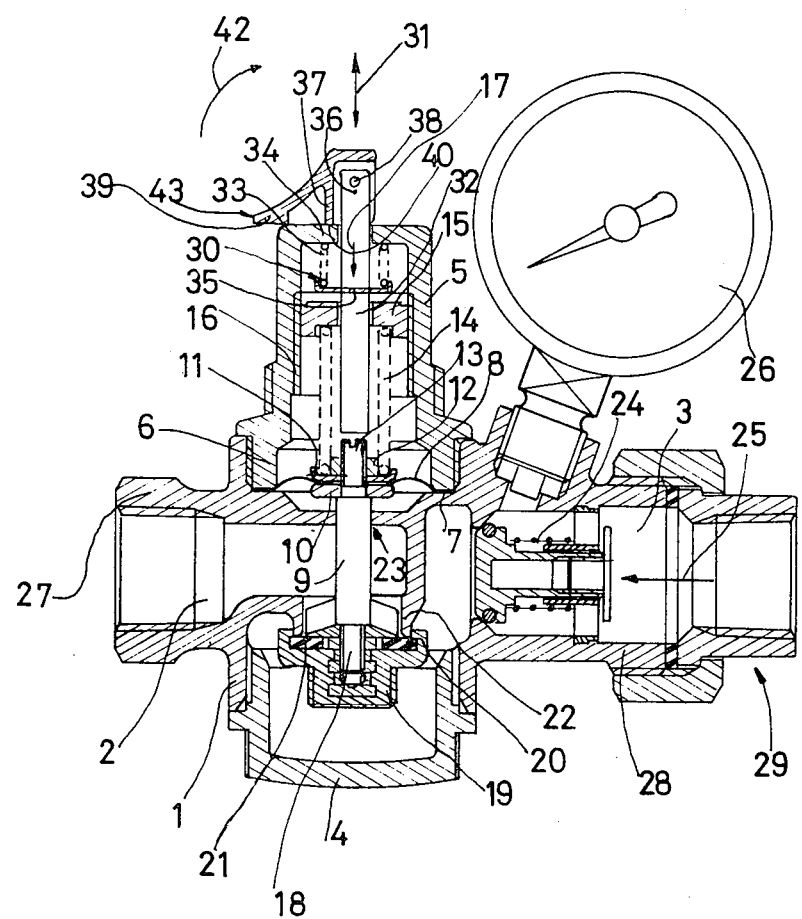

4,043,357

FILTER FITTING FOR HEATING INSTALLATIONS

FIELD OF INVENTION

The invention relates to a filter fitting, particularly for heating installations, especially of an enclosed type, the said fitting having an inlet and an outlet passage and, arranged therebetween, a pressure reducer, the valve mechanism of which is spring-loaded to open.

PRIOR ART

When a heating installation is being filled, the pressure differential between the inlet connected to a water main and the outlet connected to the heating installation decreases constantly. As this differnece between the inlet and outlet pressure at the filler fitting decreases during the filling operation, there is also a decrease in the amount of liquid entering the fitting per unit of time, and the filling operation therefore slows down.

SUMMARY OF THE INVENTION

The purpose of the present invention is therefore to provide a filler fitting of the type described above, by means of which a heating installation may be filled more rapidly, if circumstances so demand. Provision is also made to ensure that the pressure in the heating installation does not become unduly high and, more particularly, to ensure that the outlet pressure in the fitting does not reach the same pressure as the inlet pressure obtaining in the supply line from water main.

In order to achieve this purpose, a filler fitting of the type described hereinbefore is proposed, the said fitting being characterised, according to the invention, in that the pressure-reducer valve mechanism, especially the valve stem, is adapted to be additionally loaded towards the open position by means of loading device which can be cut out or disconnected. When the said loading device is cut out, disconnected, or otherwise rendered inoperative, the filler fitting, which may otherwise be of conventional design, operates in the same way as known filler fittings. In the event of a large pressure differential between the inlet and outlet pressures, i.e. the pressures obtaining in the inlet and outlet passages, the pressure-renducer valve is open wide, if necessary to a maximal position. The higher the pressure in the outlet passage and the lower, therefore, the difference between the inlet and outlet pressure, the narrower the gap between the pressure-reducer valve and the seat thereof.

The said pressure-reducer is of conventional design, with a valve seat through which the water flows in a direction opposite to the direction in which the valve closes, one end of the valve stem carrying a valve plate, while the other end passes through a diaphragm and/or is secured thereto. A compression spring on the other side of the said diaphragm urges the valve mechanism in the direction of the opening, the said spring determining the open position of the valve plate, in conjunction with the presssure acting thereupon. If the loading device is now cut in or connected, an additional force acts upon the valve stem urging it to open. This means that with a constant pressure differential between the inlet and outlet passage, the pressure-reducer valve will be more widely open than it would be if the loading device were disconnected. At this pressure differential, the more widely open valve obviously allows more water to pass, and this ensures faster filling of the heating installation.

On the other hand, the force of the loading device must be such that the pressure in the heating installation cannot rise beyond a predetermined limit; more particularly, the outlet pressure must never be as high as the inlet pressure. Cutting out or disconnecting the loading device causes the flow of force between the said loading device and the valve mechanism to be interrrupted. It is to be understood that the disconnected loading device must not interfere with the movements of the pressure reducer.

In one particularly preferred example of embodiment of the invention, the loading device has a displaceable and lockable pin acted upon by a loading spring, the end of the pin pointing in the direction of loading being pressed against the relevant end of the valve stem when the said loading device is in its operative position. The loading spring must be designed, arranged, and dimensioned in a manner such that when the loading device is in its operative position it is possible to fill the heating installation more rapidly, but impossible for the outlet pressure to rise to an excessive level.

The valve stem the pin of the loading device, the loading spring, and the pressure-reducer springs are preferably arranged coaxially with each other and thus also in extension of each other, the springs being in the form of helical compression springs, the pin of the loading device passing concentrically through the loading spring. Furthermore, the said pin and/or the end of the valve stem pointing away from the valve plate, may project at least partly into the pressure-reducer spring.

According to another characteristic of the invention, the pin of the loading device passes outwardly through the housing of the filler fitting, more particularly through the cap over the pressure-reducer spring, the projecting end of the said pin being supported, when the loading spring is tensioned, by means of a lifting cam or the like mounted rotatably thereon, outside the housing or spring cap. Thus rotation of the said lifting cam causes the pin of the loading device to move longitudinally. The cam may be locked in position in any suitable manner, the said cam being designed in such a manner that, in one terminal position of rotation, it moves the loading-device pin far enough away from the relevant end of the valve stem, whereas in the other terminal position, it causes the said pin to press against the said valve stem with the aid of the loading spring. Care must be taken to ensure that the said cam does not impede the joint movement of the valve stem and the pin in the direction of opening. This means that, in the operative position, it must be spaced far enough away from its supporting surface. The loading spring is tensioned in all positions of rotation of the cam, this tension being at its maximum in the disconnected position. The said cam preferably has two support surfaces arranged at 90° to each other and is in the form of a tilting lever. It is mounted pivotably on the outwardly-projecting part, more particularly the end, of the loading-device pin, and it has a handle.

In another configuration of the invention, one end of the loading spring rests internally against the spring cap, more particularly against the bottom thereof, while the other end rests against a shoulder, preferably a ring fitted to the loading-spring pin.

According to one particularly advantageous variant of the invention, the loading-device pin is, at least in part, of non-circular cross section, preferably of polygonal cross section, for example of square cross section, this part of the said pin passing through a spring plate adapted to be screwed into the spring cap in which it is axially displaceable, the said spring plate serving to support the pressure-reducer spring and the passage therein corresponding, at this location, to the cross section of the said pin, which therefore performs two functions. In the first place, it is a part of the loading device, while in the second place, it is an element of the device for tensioning the pressure-reducer spring. Rotating the said pin in the one direction reduces the tension in the said spring, whereas rotating it in the opposite direction increases this tension.

It is of special advantage for the cam lever to be at the same time a rotatable actuating element for a device for tensioning the pressure-reducer spring, the said device consisting of this lever, the loading-device pin, and the spring plate. Thus the said lever can not only be tilted on the axis passing through it and the pin, but can also be rotated about the longitudinal axis of the pin. Tilting is therefore possible in each position of rotation, and rotation is also substantially possible in each position of tilt.

In a manner which is advantageous, but is also known per se, a return-flow check valve is incorporated into the outlet passage, the downstream side of the said valve being connected to a pressure gauge. Moreover, according to still another characteristic of the invention, the pressure-reducer, the loading device, the return-flow check valve, and the pressure gauge form a structural unit and, more particularly, have a common housing which may, if necessary, be in several parts and have at least one cover.

A central, longitudinal section of an example ofembodiment of the invention is illustrated in the drawing attached hereto.

DESCRIPTION OF THE INVENTION

Housing 1 of the filler fitting according to the invention has an inlet passage 2 and an outlet passage 3. An opening in the bottom of the said housing is closed by means of a screwed cap 4, while a so-called spring cap 5 is screwed into an opening in the top. A diaphragm 8 is clamped sealingly between the inner, tubular, threaded end of spring cap 5 and a wall 7 of the housing. A valve stem 9, longitudinally displaceable in the said housing, passes through the centre of the said diaphragm, at which point the said diaphragm is clamped between a disc 10 resting against a shoulder on valve stem 9 and a spring plate 11 on the other side of the said diaphragm. This clamping is achieved by means of a nut 12 screwed to end 13 of the said valve stem which is in the form of a threaded stud. One end of pressure-reducer spring 14 bears against spring plate 11, while the other end bears against the underside of spring plate 15. Spring 14 is in the form of a helical compression spring. Spring plate 15 has an external thread and is adapted to be screwed into internal thread 16 in spring cap 5. When spring plate 15 is screwed in the direction of arrow 17, the tension of pressure-reducer spring 14 is increased, while screwing the said plate in the opposite direction decreases the said tension.

Bottom end 18 of the valve stem carries a valve plate 19 which is prefereably equipped with a pressure-relieving annular edge 20. A soft seal 21 inserted into the said valve plate or- more generally speaking into the closing element of this valve, co-operates with a valve seat 22 which is moulded into housing 1 of the fitting. The said valve, the diaphragm, and the pressure-reducer spring all belong to a pressure reducer 23 such as is normally incorporated into the filler fittings of this kind; such a pressure reducer is illustrated in U.S. Pat. No. 1,286,397. Return flow check valve 24, which closes in the direction indicated by arrow 25, and pressure gauge 26 associated with the outlet end of this valve, are also known elements of such filler fittings. The example of embodiment illustrated in the drawing is intended for use in a closed heating installation, in which case inlet connector 27 is connected to a fresh-water line, while outlet connector 28 is connected to the water system of the closed heating installation by means of a threaded union 29. Pressure gauge 26 indicates the outlet pressure.

At a given ratio between the pressure obtaining in inlet passage 2 and that obtaining in outlet passage 3, the valve plate is lifted by a given distance off valve seat 22, depending upon the tension of spring 14 which is governed by the location of spring plate 15 on its thread. As the piping in the heating installation is filled, the outlet pressure rises, and the ratio between inlet and outlet pressure decreases. This causes valve plate 19, and all parts whose movements depend thereon, to move in a direction opposite to that of arrow 17. This brings about a constant decrease in the space between the valve seat and the valve plate, thus reducing the volume of water flowing therethrough. Thus, as the pressure differential decreases, the filling operation slows donw. The design of this fitting according to the invention is intended to correct this.

In order to speed up the filling operation, as compared with equivalent filler fittings or filler fittings of the same dimensions, without interfering with ths essential decrease in differential pressure, provision is made to load valve stem 9 and the valve mechanism of pressure-reducer 23 additionally in the direction of opening, and this is achieved by means of a loading device 30. This device may be cut out, disconnected or otherwise rendered inoperative. One important component of this loading device is a pin 32 mounted in the spring cap and adapted to move in the direction of double arrow 31. Pin 32 is arranged coaxially with valve stem 9 and, when loading device 30 is in the cut-out or disconnected position, the lower end of the pin is at a distance from end 13 of the valve stem. Arranged concentically with pin 32 is a loading spring 33, also in the form of a helical compression spring, the upper end thereof bearing against the inside end 34 of spring cap 5, while the lower end is supported on a shoulder 35 or a suitable ring, for example a circlip. This spring applies to pin 32 a force acting in the direction of arrow 17.

Pin 32 passes through the spring cap, and end 34 thereof, to the outside, a lifting cam 37 being mounted rotatably on the end of the said pin by means of a pin 38. The force of loading spring 33 causes the said cam to bear against the outside, or bottom 34, of spring cap 5. The cam is in the form of a tilting lever having a handle 39 and two support surfaces 40, 41 perferably at 90° to each other. In the drawing, the cam is shown resting on the support surface more remote from the axis of rotation, pin 38. If said cam is pivoted in the direction of arrow 42, after it has moved through 90° support surface 41 will reach a position approximately parallel with bottom 34 of spring cap 5, and loading spring 33 is allowed to act, since pin 32 is now bearing against end 13 of the valve stem. This is made possible because cam surface 41 is closer to pin 38 than surface 40. This rotation through 90° thus produces a larger force which acts upon the valve plate, and all parts whose movements depend thereon, in the direction in which the valve opens. This means that, for a given differential pressure, valve 19, 22 is wider open than it would be if loading device 30 were disconnected. This accelerates the filling operation and shortens the filling time.

During rapid filling, the outlet pressure must counteract the sum of the tensions of springs 14 and 33. An outlet pressure of 1 bar, for example, acting against the two springs would cause valve plate 19 to move towards valve seat 22 by 1mm, whereas with spring 14 only in operation, this movement would be 1.5mm, for example.

The said springs, however, are designed in such a manner that even when both are operative, the pressure in outlet passage 3 cannot become excessive and will always be less than in inlet passage 2. This is achieved by making the force of pressure-reducer spring 14 adjustable by means of spring plate 15, in the manner described above. According to one particular configuration of this invention, pin 32 of loading device 30 is also used as the element whereby this adjustment is made. To this end, the internal end of pin 32 is square and passes through a square hole in the centre of spring plate 15, the fit being such that the pin may be displaced in relation to spring plate 15. Spring 14 may be tensioned or relieved by rotating handle 39, and thus pin 32, about the longitudinal axis of the said pin.

Loading device 30 may obviously also be raised by means of some other device, for example by providing a releasable catch and merely exerting a pull on the pin.

I claim:

1. A filler fitting especially for heating installations having a housing, an inlet and an outlet to said housing, a pressure-reducer between said inlet and outlet, said pressure-reducer having a valve mechanism which is spring loaded towards an open position, means additionally loading said valve mechanism in the direction of opening and releasable means for disconnecting said additional means, said valve mechanism including a valve stem and said additional means comprises a pin with a spring biasing said pin against said valve stem the spring acting on said valve stem and the spring biasing said pin being co-axial, said pin having a non circular cross section, a plate in said housing adapted for threaded movement thereon, said plate having an aperture corresponding to said non circular section of said pin passing through said aperture, said plate serving to support the said spring acting on said valve stem.

2. A fitting according to claim 1 wherein said tilting cam is rotatable on said housing thereby actuating said pin and said plate to adjust the pressure on the spring biasing said pin.

* * * * *